(12) United States Patent
Ahmadvand

(10) Patent No.: US 7,058,097 B2
(45) Date of Patent: Jun. 6, 2006

(54) WAVELENGTH LOCKING FOR MULTI-WAVELENGTH LASER SOURCE

(75) Inventor: Nima Ahmadvand, Ottawa (CA)

(73) Assignee: Peleton Photonic Systems Inc., Ottawa (CA)

( * ) Notice: Subject to any disclaimer, the term of this patent is extended or adjusted under 35 U.S.C. 154(b) by 255 days.

(21) Appl. No.: 10/832,305

(22) Filed: Apr. 27, 2004

(65) Prior Publication Data

US 2005/0063429 A1 Mar. 24, 2005

Related U.S. Application Data

(60) Provisional application No. 60/499,720, filed on Sep. 4, 2003.

(51) Int. Cl.
*H01S 3/10* (2006.01)

(52) U.S. Cl. ............................. 372/20; 372/21; 372/70

(58) Field of Classification Search ................ 372/20, 372/21, 22, 26, 70; 359/730
See application file for complete search history.

(56) References Cited

U.S. PATENT DOCUMENTS

| | | | |
|---|---|---|---|
| 6,826,207 B1* | 11/2004 | Xu et al. ..................... | 372/21 |
| 2002/0024978 A1* | 2/2002 | Inagaki et al. ............... | 372/20 |
| 2003/0123066 A1 | 7/2003 | Park .......................... | 356/484 |

* cited by examiner

*Primary Examiner*—Don Wong
*Assistant Examiner*—Jimmy Vu

(57) ABSTRACT

New systems and methods for wavelength locking for a class of multi-wavelength laser sources (MWLS) are provided. In this type of MWLS, the set of output wavelength channels are produced from a limited number of initial laser sources, such as a single laser or dual laser. In this invention, the initial lasers are locked based on the wavelengths of the outer channels in the set of output channels to provide tighter channel locking than that of a single laser source. This is mainly possible since the error in channel spacing caused by channel wavelength offset of the seed lasers is amplified by channel multiplication done in MWLS. This provides better resolution than applying wavelength locking to the seed lasers.

16 Claims, 2 Drawing Sheets

WAVELENGTH LOCKING FOR MULTI-WAVELENGTH LASER SOURCE

RELATED APPLICATIONS

This application claims priority from U.S. Provisional Patent Application No. 60/499,720 filed on Sep. 4, 2003.

FIELD OF THE INVENTION

This invention generally relates to wavelength locking for laser systems used in optical communications and more particularly to optical laser sources with multiple lasing wavelengths.

BACKGROUND OF THE INVENTION

Wavelength Division Multiplexing (WDM) offers the most efficient method to exploit the available bandwidth. As the technology progresses the number of feasible channels in the total band is increasing from a handful number to a large number of channels. With tighter channel spacing and wider wavelength bands, the technology is evolving towards Dense WDM, or DWDM.

The DWDM systems now need a large number of laser sources. Large sets of discrete lasers have been used to realize the laser sources required. Multi-wavelength laser sources (MWLS) provide an attractive and cost effective alternative. Wavelength locking is a definite requirement especially for a tightly spaced large set of channels to ensure negligible cross talk and to eliminate any chance of wavelength channels running into each other. As a matter of fact, wavelength locking could be a limiting factor in scaling up the discrete set of lasers to very large sets.

A center wavelength of each laser is usually locked to a standard wavelength such as one proposed in an ITU grid. In an MWLS, a central locking mechanism can establish the locking of the whole set to any grid of interest. The complexity of such a system is much lower than that of a rack of a discrete set of lasers. It is also noted that for a large number of lasers, the driving circuit size might be prohibitive. As a result, a number of subsystems each hosting a subset of channels must be built and then combined. This adds extra loss and other issues such as crosstalk may result from the combiner or multiplexer.

SUMMARY OF THE INVENTION

New systems and methods for wavelength locking for a class of multi-wavelength laser sources (MWLS) are provided. In this type of MWLS, a set of output wavelength channels are produced from a limited number of initial laser sources known as seed lasers. For example, the seed lasers can be a single laser or a dual laser. In this invention, the initial lasers are locked based on wavelengths of outer channels in the set of output channels to provide tighter channel locking than that of a single laser source. This is mainly possible since an error in channel spacing caused by channel wavelength offset of the seed lasers is amplified by channel multiplication done in MWLS. This provides better resolution than applying wavelength locking to the seed lasers.

According to one broad aspect, the invention provides a method of locking a multi-wavelength source laser (MWLS) in which at least two seed lasers are used to generate multiple laser outputs and in which the multiple laser outputs include outputs at the wavelengths of the seed lasers, the method comprising: tuning each of at least one seed laser based on a laser output at a monitoring wavelength equal to the wavelength of the respective seed laser; tuning each of at least one seed laser based on a laser output at a monitoring wavelength other than that of the respective seed laser.

In some embodiments, the laser output at a wavelength other than that of the respective seed laser is selected to be near or at an outer edge of the overall set of wavelengths generated by the MWLS.

In some embodiments, the laser output at a wavelength other than that of the respective seed laser is selected to be a channel amongst an integer number greater than or equal to N*0.2 channels at an outer edge of the overall set of wavelengths generated by the MWLS, wherein N is the total number of channels generated by the MWLS.

In some embodiments, tuning a seed laser comprises performing locking based on a selected monitoring wavelength to generate an adjustment signal which is then used to control a seed laser driver.

According to another broad aspect, the invention provides a method of locking an MWLS in which at least two seed lasers are used to generate multiple laser outputs and in which the multiple laser outputs include outputs at wavelengths of the seed lasers, the method comprising: tuning each of the at least two seed lasers based on a laser output at a respective wavelength other than that of the respective seed laser.

In some embodiments, respective wavelengths other than those of the respective seed lasers for tuning each of the at least two seed lasers are selected to be near or at opposite outer edges of the overall set of wavelength generated by the MWLS.

In some embodiments, tuning each of the at least two seed lasers based on the laser output at a respective wavelength other than that of the respective seed laser comprises performing locking based on the selected wavelengths; performing drift calculations with which to generate adjustment signals for seed laser drivers as a function of wavelength offsets determined for monitoring wavelengths, and applying the adjustment signals to the seed laser drivers.

According to another broad aspect, the invention provides a method of locking an MWLS in which one seed laser is used together with an RF modulator to generate multiple laser outputs, the method comprising: performing locking on two wavelengths of the multiple laser outputs to generate two adjustment signals; tuning the RF modulator and a centre wavelength of the seed laser as a function of the two adjustment signals.

According to another broad aspect, the invention provides an apparatus comprising: an MWLS having at least two seed lasers that are tuned by respective seed laser drivers, the at least two seed lasers are used to generate multiple laser outputs and in which the multiple laser outputs include outputs at wavelengths of the seed lasers; for a first selected monitoring wavelength, a first wavelength locker adapted to generate a first control signal proportional to a difference between the first selected monitoring wavelength and a first target wavelength; for a second selected monitoring wavelength, a second wavelength locker adapted to generate a second control signal proportional to a difference between the second selected monitoring wavelength and a second target wavelength; wherein seed laser driver control signals used to adjust the respective seed laser drivers are a function of the first and second control signals; wherein at least one of the first and second selected monitoring wavelengths are other than target seed laser driver wavelengths.

In some embodiments, the first and second selected monitoring wavelengths are other than target seed laser driver wavelengths.

In some embodiments, at least one of the first and second selected monitoring wavelengths which are other than the target seed laser driver wavelengths are selected to be near or at an outer edge of an overall set of wavelengths generated by the MWLS.

In some embodiments, a first selected monitoring wavelength and a second selected monitoring wavelength are selected to be near or at opposite outer edges of the overall set of wavelength generated by the MWLS.

In some embodiments, tuning a seed laser comprises performing locking based on the selected monitoring wavelength to generate an adjustment signal which is then used to control a seed laser driver.

In some embodiments, an apparatus comprises: a tap coupler for extracting a portion of an output signal of the MWLS; a splitter for splitting the portion of the output signal into first and second signals; a first band pass filter (BPF) adapted to filter the first signal to produce an input to the first wavelength locker; a second BPF adapted to filter the second signal to produce an input to the second wavelength locker.

In some embodiments, an apparatus further comprises: drift calculating means for determining the seed laser driver control signals for the seed lasers as a function of wavelength adjustments determined by the wavelength lockers.

In some embodiments, the drift calculating means operates in accordance with the following equations, where $\lambda_i$ and $\lambda_{i+1}$ are the desired wavelengths of the two seed lasers, $\lambda_p$ and $\lambda_q$ are monitoring wavelengths, the seed wavelengths $\lambda_i$ and $\lambda_{i+1}$ drift by $\delta_i$ and $\delta_{i+1}$ to $\hat{\lambda}_i$ and $\hat{\lambda}_{i+1}$ respectively, the monitoring wavelengths drift by $\delta_p$ and $\delta_q$ for $\lambda_p$ and $\lambda_q$, respectively:

$$\delta_i = \frac{\begin{vmatrix} \delta_p & (p-i) \\ \delta_p & (p-i) \end{vmatrix}}{\begin{vmatrix} 1-p+i & p-i \\ 1-q+i & q-i \end{vmatrix}} = \frac{(q-i)\delta_p - (p-i)\delta_q}{(1-p+i)(q-i)-(1-q+i)(p-i)}$$

$$\delta_{i+1} = \frac{\begin{vmatrix} 1-p+i & \delta_p \\ 1-q+i & \delta_q \end{vmatrix}}{\begin{vmatrix} 1-p+i & p-i \\ 1-q+i & q-i \end{vmatrix}} = \frac{(1-p+i)\delta_q - (1-q+i)\delta_p}{(1-p+i)(q-i)-(1-q+i)(p-i)}.$$

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
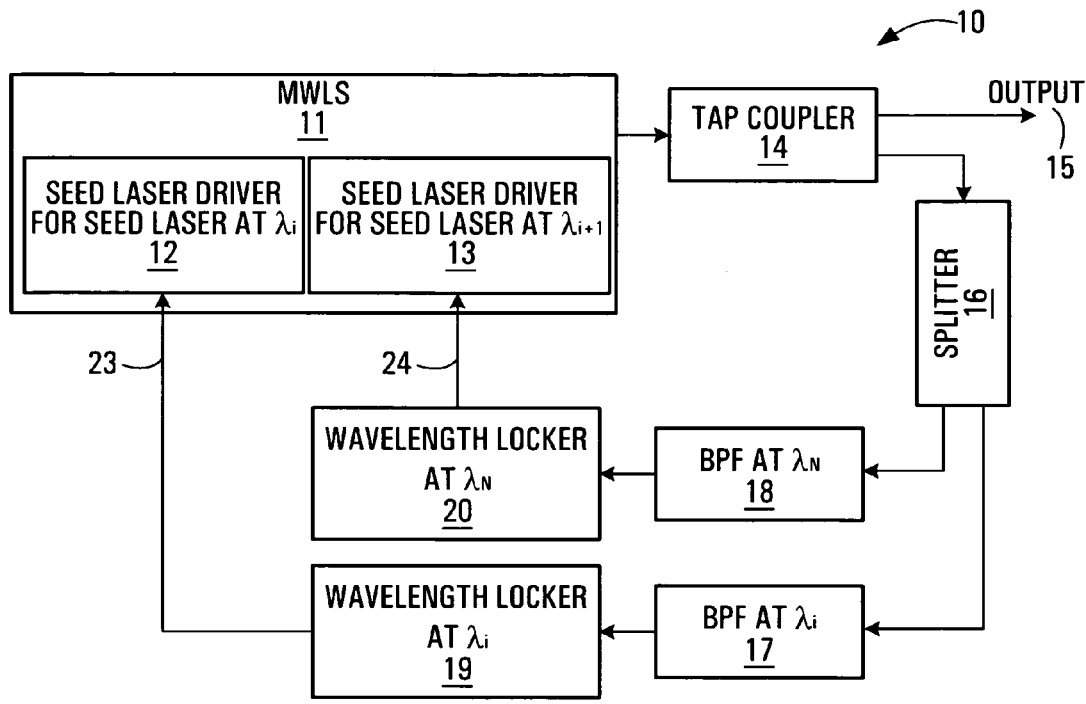
FIG. 1 is a schematic diagram of a wavelength locking system for a MWLS provided by an embodiment of the invention.

A wavelength locking system and method applicable to a class of multi-wavelength laser sources (MWLS) are provided by embodiments of the invention. In this type of MWLS, output wavelength channels are generated from a limited set of seed laser sources, usually one or two lasers. The initial limited set of channels is multiplied in number using such effects as optical fiber non-linearity. For an example of one of these systems refer to commonly assigned U.S. patent application Ser. No. 10/015,753 hereby incorporated by reference in its entirety. Since channel spacing of a final output set of channels is dictated by an initial set channel spacing, an error in the channel spacing of the initial set of laser sources is magnified towards outer channels of a band of the output wavelength channels. If the output channels are to be locked on an ITU grid, the seed lasers must be locked to adjacent wavelengths on the ITU grid as accurately and with as much stability as possible. Any wavelength offset from the grid will result in a larger magnified offset in the outer channels. As a result, a tighter wavelength locking tolerance than is necessary for individual lasers is required. For example, in a dual laser system such as the one presented in the above-referenced U.S. application Ser. No. 10/015,753, the channel spacing of the MWLS is dictated by the channel spacing of the two seed lasers. If the seed lasers are located substantially at the mid-point of the wavelength range of interest and the initial channel spacing, i.e. wavelength difference of the two seed lasers, changes by 10 pm, the outer channel in a 40 channel system will move by 20 times more, which is 200 pm. The legacy type of wavelength locking on an individual laser can only provide wavelength accuracy in the range of 10 to 20 pm. In many telecommunication systems the tolerance on the wavelength accuracy is normally around the same range, i.e. 10 to 20 pm. Consequently, wavelength locking of the seed laser based on its own wavelength is not sufficient for MWLS systems of the type mentioned above.

Embodiments of the invention provide a novel system and method that lock the seed laser sources, especially for dual laser MWLS systems, based on the outer channel wavelengths rather than the seed channel wavelengths themselves. By doing this, the magnified error observed at the location of the outer channels provides improved accuracy compared to the legacy type wavelength locking applicable to individual lasers.

From here on, the wavelength locking scheme for MWLS is explained based on dual laser seeds. However, the same technique can be applied to other MWLS systems with different initial sets of lasers. In a dual laser based MWLS, according to an embodiment of the invention, first and second seed lasers are locked based on any two channels at the output. These two channels will be referred to as "monitoring" channels or wavelengths for ease of reference. By selecting the monitoring wavelengths farther apart from each other a better resolution is achieved for wavelength locking. In an exemplary MWLS system with N channels, the center wavelengths are defined as $\{\lambda_1, \lambda_2, \ldots, \lambda_i, \lambda_{i+1}, \ldots, \lambda_N\}$, where $\lambda_i$ and $\lambda_{i+1}$ are wavelengths of the seed lasers. In a C-band wavelength range having 40 channels with 100 GHz channel spacing the value of N is equal to 40. In a case where there are 80 channels with 50 GHz channel spacing the value of N is equal to 80.

A first embodiment of the wavelength locking system 10 is illustrated in FIG. 1. Shown is a MWLS 11 which requires locking. In this particular example the MWLS 11 comprises a first seed laser driver 12 and a second seed laser driver 13. An output of the MWLS 11 is supplied to an input of a tap coupler 14. The tap coupler 14 has first and second outputs. The first output 15 is an output of the overall system 10. The second output is supplied to an input of a power splitter 16. The power splitter 16 has first and second outputs. The first output is connected to a first band pass filter (BPF) 17. The second output is connected to a second BPF 18. An output of the first BPF 17 is supplied to a first wavelength locker 19. An output of the second BPF 18 is supplied to a second wavelength locker 20. An output of the first wavelength locker 19 is supplied to the first seed laser driver 12. An output of the second wavelength locker 20 is supplied to the second seed laser driver 13.

In operation, the MWLS generates multiple wavelength outputs from the first and second seed laser drivers 12,13. A small portion of the output of the MWLS is tapped off with the tap coupler 14 with a remainder of the output being supplied to the output 15 of the overall system 10. The small portion of the output is then split into first and second portions by the power splitter 16. The first portion is filtered by the first BPF 17 to allow only a single wavelength channel to continue on to the first wavelength locker 19. An output signal 23 of the first wavelength locker 19 is used to control the first seed laser driver 12, which tunes the first seed laser. The second portion is filtered by the second BPF 18 to allow only a single wavelength channel to continue on to the second wavelength locker 20. An output signal 24 of the second wavelength locker 20 is used to control the second seed laser driver 13, which tunes the second seed laser.

In a first embodiment of the wavelength locking scheme, a first seed wavelength, $\lambda_i$, is locked based on its own position and a second seed wavelength, $\lambda_{i+1}$, is locked based on one of the outer channels, previously referred to as a monitoring wavelength, such as $\lambda_N$. The first seed wavelength is locked like a wavelength of any single laser to provide a point of reference for the whole of the output channels, while the second seed wavelength benefits from an outer channel magnified resolution. As a result, the magnification is half of the total value possible, if the wavelengths of the seed lasers are in the middle of covered wavelength band. Referring to FIG. 1, the first wavelength locker 19 generates the output signal 23 that is proportional to a difference between a target wavelength $\lambda_i$ and an input signal supplied by the first BPF 17, which is also at the wavelength $\lambda_i$. However, the second wavelength rocker 20 generates the output signal 24 that is proportional to a difference between a target wavelength $\lambda_{i+1}$ and an input signal supplied by the second BPF 18, which is at the wavelength $\lambda_N$. Then, the output signals 23,24 are used to make adjustments to the respective first and second seed laser drivers 12,13. The output signal 24 of the second wavelength locker 20 is used to adjust the second seed laser driver 13 even though the second seed laser is operating at a different wavelength than the input signal wavelength supplied to the second wavelength locker 20 by the second BPF 18.

In the case of FIG. 1 as described above, wavelength stability of the first seed wavelength $\lambda_i$ is maintained using the output signal 23 of the first wavelength locker 19 as a control input to the first seed laser driver 12 to lock the output of the first BPF 17 to the same wavelength $\lambda_i$. The wavelength stability of the second seed wavelength $\lambda_{i+1}$ is maintained at the target wavelength $\lambda_{i+1}$ by using the output signal 24 of the second wavelength locker 20 as a control input to the second seed laser driver 13. The control input, determined based on a drift error in the wavelength $\lambda_N$ determined in wavelength locker 20 is used to adjust the second seed wavelength $\lambda_{i+1}$ generated by the second seed laser. In a preferred embodiment $\lambda_N$ is chosen to be a channel that is near either of the opposite outer edges of the band of the output signals generated by the MWLS. In some embodiments, a monitoring wavelength is a wavelength of one channel of an integer number greater than or equal to N*0.2 channels at an outer edge of the band of the output signals. For example, if N is equal to 40, the monitoring wavelength would be the wavelength of one of the 8 outermost channels at either end of the band of output channels. More generally, the monitoring wavelength defined as $\lambda_N$ can be any channel. However, wavelength locker performance may degrade the closer $\lambda_N$ is chosen to $\lambda_{i+1}$. In a particular embodiment $\lambda_i$ and $\lambda_{i+1}$ are close to the middle of the band of wavelength channels output by the MWLS. More generally, $\lambda_i$ and $\lambda_{i+1}$ can be chosen to be anywhere within the band.

A seed laser driver typically adjusts a wavelength of a seed laser as a function of an output signal from a wavelength locker by controlling the temperature and/or current of the laser. Details of adjusting the wavelength of the seed laser may vary for different drivers and for different types of lockers, and these details are not essential to the invention.

Figure 2:
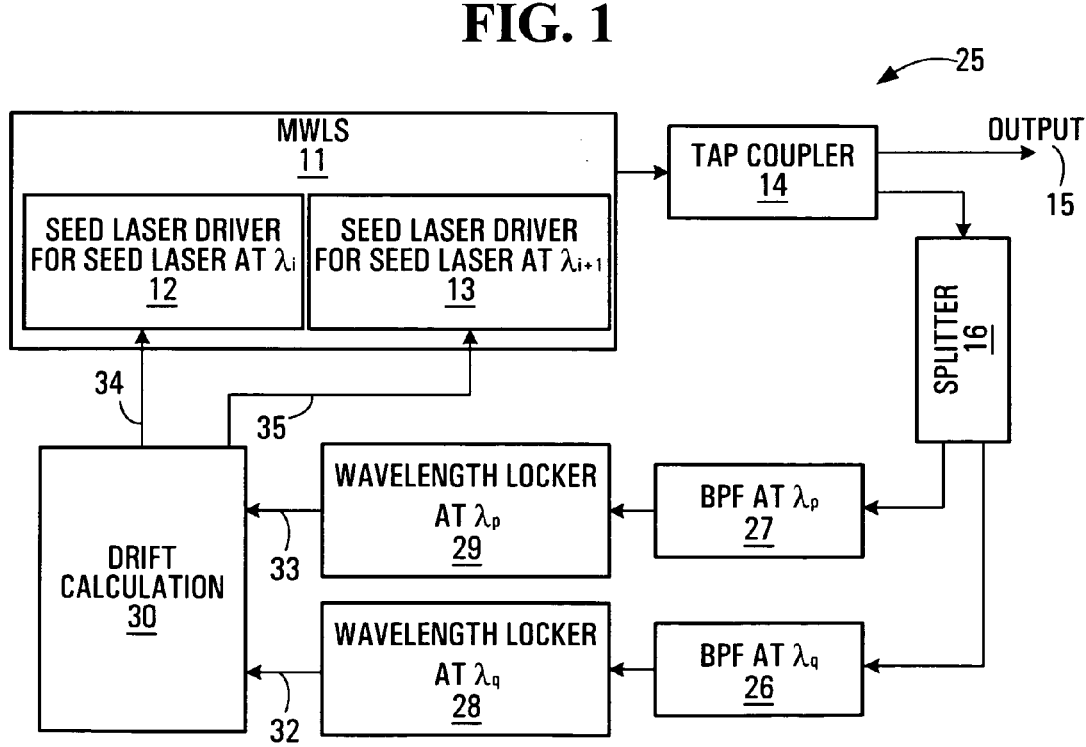
FIG. 2 is a schematic diagram of a wavelength locking system for an MWLS provided by another embodiment of the invention.

Another embodiment of the invention is shown in FIG. 2. In this embodiment, there are again the first and second seed laser drivers 12,13, the tap coupler 14, the power splitter 16, first and second BPF 26,27, and first and second wavelength lockers 28,29. The first and second BPF 26,27 and first and second wavelength lockers 28,29 operate in a functionally similar manner to comparable elements in FIG. 1. In addition, an output 32 of the first wavelength locker 28 and an output 33 of the second wavelength locker 29 are supplied to a drift calculation function 30. The drift calculation 30 has first and second outputs 34,35, the first output 34 is supplied to the first seed laser driver 12 and the second output 35 is supplied to the second seed laser driver 13.

In this embodiment, any pair of channels are selected from the output set as monitoring channels to be used in calculating the drift of each seed laser. In the preferred embodiment, the channels which are selected for monitoring are as far apart as possible. The calculated drift is then applied to the first and second laser drivers 12,13 of the first and second seed lasers respectively. Selecting channels p and q, where $1 \leq p$, $q \leq N$ and $p \neq q$, the drift of each of the seed lasers can be calculated according to Equations (1) to (8).

In the following equations, $\lambda_i$ and $\lambda_{i+1}$ are the wavelengths of the two seed lasers, $\lambda_p$ and $\lambda_q$ are monitoring wavelength channels. Let's assume the seed wavelengths $\lambda_i$ and $\lambda_{i+1}$ drifted by $\delta_i$ and $\delta_{i+1}$ to $\hat{\lambda}_i$ and $\hat{\lambda}_{i+1}$ respectively. As a result of the wavelength drift on the seed lasers, the wavelength lockers detect wavelength drift in monitoring wavelengths, i.e. $\lambda_p$ and $\lambda_q$. These drifts are indicated as $\delta_p$ and $\delta_q$ for $\lambda_p$ and $\lambda_q$, respectively. Equations (1) to (8) put the above relations in terms of mathematical equations.

$$\hat{\lambda}_p = \hat{\lambda}_i + (p-i)\Delta\hat{\lambda} \quad (1)$$

$$\hat{\lambda}_q = \hat{\lambda}_i + (q-i)\Delta\hat{\lambda} \quad (2)$$

$$\Delta\hat{\lambda} = \hat{\lambda}_{i+1} - \hat{\lambda}_i \quad (3)$$

$$\Delta\lambda = \lambda_{i+1} - \lambda_i \quad (4)$$

$$\hat{\lambda}_i = \lambda_i + \delta_i \quad (5)$$

$$\hat{\lambda}_{i+1} = \lambda_{i+1} + \delta_{i+1} \quad (6)$$

$$\hat{\lambda}_p = \lambda_p + \delta_p \quad (7)$$

$$\hat{\lambda}_q = \lambda_q + \delta_q \quad (8)$$

In the above equations, $\Delta\lambda$ is the target channel spacing while $\Delta\hat{\lambda}$ indicates the actual channel spacing. The wavelength drifts for monitoring channels, i.e. $\delta_p$ and $\delta_q$, are the values that are measured by the wavelength lockers. The only unknown parameters in Equations (1) to (8) are $\delta_i$ and $\delta_{i+1}$, which are the wavelength drifts for the seed lasers. Combining the above equations leads to the following equations.

$$\lambda_p + \delta_p = \lambda_i + \delta_i + (p-i)(\Delta\lambda + \delta_{i+1} - \delta_i) \quad (9)$$

$$\lambda_q + \delta_q = \lambda_i + \delta_i + (q-i)(\Delta\lambda + \delta_{i+1} - \delta_i) \quad (10)$$

Rearranging the above equations produces a system of two equations below, that can be solved for $\delta_i$ and $\delta_{i+1}$.

$$\lambda_p - \lambda_i + \delta_p - (p-i)\Delta\lambda = (1-p+i)\delta_i + (p-i)\delta_{i+1} \quad (11)$$

$$\lambda_q - \lambda_i + \delta_q - (q-i)\Delta\lambda = (1-q+i)\delta_i + (q-i)\delta_{i+1} \quad (12)$$

Considering the following relations, the above equations can be simplified further.

$$\lambda_p - \lambda_i = (p-i)\Delta\lambda \quad (13)$$

$$\lambda_q - \lambda_i = (q-i)\Delta\lambda \quad (14)$$

From Equations (11) to (14), a simplified system of equations can be obtained as follows.

$$\delta_p = (1-p+i)\delta_i + (p-i)\delta_{i+1} \quad (15)$$

$$\delta_q = (1-q+i)\delta_i + (q-i)\delta_{i+1} \quad (16)$$

Finally the solution of the above system is shown below.

$$\delta_i = \frac{\begin{vmatrix} \delta_p & (p-i) \\ \delta_p & (p-i) \end{vmatrix}}{\begin{vmatrix} 1-p+i & p-i \\ 1-q+i & q-i \end{vmatrix}} = \frac{(q-i)\delta_p - (p-i)\delta_q}{(1-p+i)(q-i) - (1-q+i)(p-i)} \quad (17)$$

$$\delta_{i+1} = \frac{\begin{vmatrix} 1-p+i & \delta_p \\ 1-q+i & \delta_q \end{vmatrix}}{\begin{vmatrix} 1-p+i & p-i \\ 1-q+i & q-i \end{vmatrix}} = \frac{(1-p+i)\delta_q - (1-q+i)\delta_p}{(1-p+i)(q-i) - (1-q+i)(p-i)} \quad (18)$$

For example, consider a case in which channels 40 and 1 are used as the monitoring channels, i.e. p=40 and q=1 in a 40 channels system, where the respective drifts are detected as $\delta_p$=10 pm and $\delta_q$=5 pm. The seed laser drifts can be calculated using Equations (17) and (18). In this case, $\delta_i$=7.56 pm and $\delta_{i+1}$=7.69 pm. The laser driver circuit, then, must adjust the temperature and/or the laser currents to compensate for these drifts.

A very specific example of how to calculate drifts for use in driving the seed lasers has been presented. The invention is not limited to this particular example. It is to be clearly understood that there are many ways of determining control inputs for the seed lasers as a function of measurements taken on the monitoring wavelengths. Different functions and/or additional functions such as filtering may also be implemented.

The laser driver circuit usually works in a closed loop fashion and dynamically compensates the drift.

In the general case, some calculation power is needed in circuitry associated with the wavelength locker. The calculation power required in the drift calculation 30 can be provided by hardware means and/or software means. Implementation of the calculation power can be an application-specific integrated circuit (ASIC), a microprocessor with hardwired digital logic capable of performing the operations needed for solving the equations or a digital signal processing chip that can perform mathematical calculations based on algorithmic code stored in memory.

For a maximum locking enhancement, p=1 and q=N, which represents using the channels at opposite ends of the wavelength band of the output channels generated by the MWLS. If p=i and q=i+1, then the wavelength locking is similar to individual locking on each seed laser. Finally, p=i and q=N, matches the scheme depicted in FIG. 1. Generally p and q can be any two channels in the band of wavelength channels output by the MWLS. However, it is important to note that the wavelength locking performance may degrade if p and q are close to the respective seed laser wavelengths.

Figure 3:
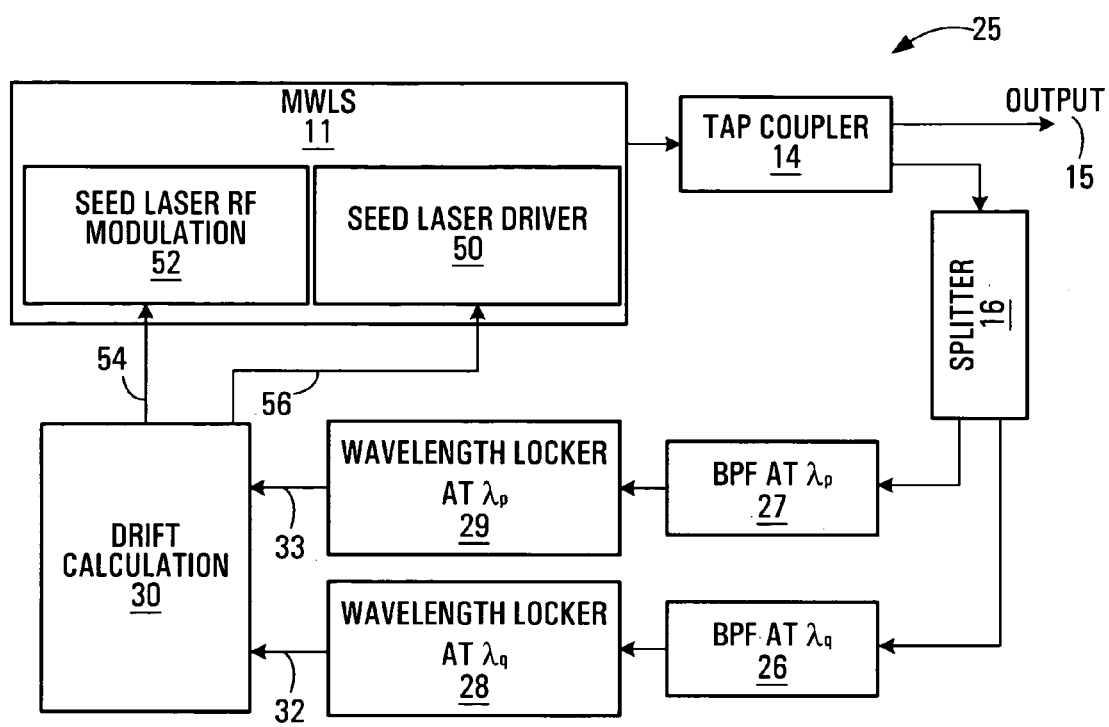
FIG. 3 is a schematic diagram of a wavelength locking system for an MWLS provided by another embodiment of the invention.

In another embodiment, the invention is applied in the context of a system with a single seed laser. An example implementation is shown in FIG. 3. In this embodiment, there is an RF modulator 52 which is used to modulate the seed laser. In another embodiment, a mode-locked laser with a particular channel spacing is employed. The remaining components of FIG. 3 are the same as described earlier with reference to FIG. 2, but the drift calculation is different. According to this embodiment, the wavelength locker system of FIG. 2 which provides wavelength adjustments for two different wavelengths typically both other than the laser wavelength, is now used to generate an adjustment/offset 56 to a center wavelength as well as an RF frequency shift 54 to adjust the RF modulator.

Referring now to all of FIGS. 1 to 3, the components that comprise the wavelength locking system 10,25 can be implemented in numerous forms.

In a preferred embodiment of the invention, the tap coupler 14 has a ratio where the second output is a relatively small percentage of the input to the tap coupler 14 when compared to the first output 15. More generally, the ratio of the first output 15 to second output can be any desired ratio depending on the requirements of a user. In some embodiments of the invention the tap coupler 14 is an "off the shelf" tap coupler such as a fused fiber coupler or a thin film filter coupler. In other embodiments the tap coupler 14 is implemented on an optical substrate using a waveguide structure.

In a preferred embodiment of the invention, the power splitter 16 splits the output of the tap coupler 14 equally. More generally, the desired ratio of splitting an input to the power splitter 16 depends on the requirements of the user. For example, the splitting ratio may be used to compensate for losses in the BPFs 17,18,27,28 or differences in the magnitudes of the generated output channels from the MWLS 11. In some embodiments of the invention the power splitter 16 is an "off the shelf" power splitter such as a fused fiber splitter or a thin film filter splitter. In other embodiments the power splitter 15 is implemented on an optical substrate using a waveguide structure.

The BPF 17,18,26,27 can be any type of optical filter with characteristics (insertion loss, PDL, channel isolation) defined by the user to provide a sufficient filtering capability. In some embodiments the BPF is a fixed channel BPF and in other embodiments the BPF is a tunable BPF so as to allow the wavelength locking system to choose different monitoring channels. In some embodiments it may be advantageous to have one fixed channel BPF and one tunable BPF.

The wavelength lockers 19,20,28,29 can be implemented with any conventional technology. Two examples of conventional technology used to implement wavelength lockers are bulk optics and thin film filters.

In some embodiments the MWLS 11, the tap coupler 14, the power splitter 16 and the BPFs 17,18,26,27 are implemented using integrated optics on one or more optical substrates. In other embodiments the wavelength locking apparatus is a combination of discrete components which are coupled together by optical fiber or waveguide connections.

Typically connections between the wavelength lockers 19,20 and the seed laser drivers 12,13 or the wavelength lockers 28,28, the drift calculation 30 and the seed laser drivers 12,13 are electrical connections. More generally, the connections can be provided by any means capable of transmitting the required signal from point-to-point.

Numerous modifications and variations of the present invention are possible in light of the above teachings. It is therefore to be understood that within the scope of the appended claims, the invention may be practised otherwise than as specifically described herein.

The invention claimed is:

1. A method of locking a multi-wavelength source laser (MWLS) in which at least two seed lasers are used to generate multiple laser outputs and in which the multiple laser outputs include outputs at the wavelengths of the seed lasers, the method comprising:
   tuning each of at least one seed laser based on a laser output at a monitoring wavelength equal to the wavelength of the respective seed laser;
   tuning each of at least one seed laser based on a laser output at a monitoring wavelength other than that of the respective seed laser.

2. A method according to claim 1, wherein the laser output at a wavelength other than that of the respective seed laser is selected to be near or at an outer edge of the overall set of wavelengths generated by the MWLS.

3. A method according to claim 1, wherein the laser output at a wavelength other than that of the respective seed laser is selected to be a channel amongst an integer number greater than or equal to N*0.2 channels at an outer edge of the overall set of wavelengths generated by the MWLS, wherein N is the total number of channels generated by the MWLS.

4. A method according to claim 1, wherein tuning a seed laser comprises performing locking based on a selected monitoring wavelength to generate an adjustment signal which is then used to control a seed laser driver.

5. A method of locking an MWLS in which at least two seed lasers are used to generate multiple laser outputs and in which the multiple laser outputs include outputs at wavelengths of the seed lasers, the method comprising:
   tuning each of the at least two seed lasers based on a laser output at a respective wavelength other than that of the respective seed laser.

6. A method according to claim 5, wherein respective wavelengths other than those of the respective seed lasers for tuning each of the at least two seed lasers are selected to be near or at opposite outer edges of the overall set of wavelength generated by the MWLS.

7. A method according to claim 5, wherein tuning each of the at least two seed lasers based on the laser output at a respective wavelength other than that of the respective seed laser comprises performing locking based on the selected wavelengths; performing drift calculations with which to generate adjustment signals for seed laser drivers as a function of wavelength offsets determined for monitoring wavelengths, and applying the adjustment signals to the seed laser drivers.

8. A method of locking an MWLS in which one seed laser is used together with an RF modulator to generate multiple laser outputs, the method comprising:
   performing locking on two wavelengths of the multiple laser outputs to generate two adjustment signals;
   tuning the RF modulator and a centre wavelength of the seed laser as a function of the two adjustment signals.

9. An apparatus comprising:
   a MWLS having at least two seed lasers that are tuned by respective seed laser drivers, the at least two seed lasers are used to generate multiple laser outputs and in which the multiple laser outputs include outputs at wavelengths of the seed lasers;
   for a first selected monitoring wavelength, a first wavelength locker adapted to generate a first control signal proportional to a difference between the first selected monitoring wavelength and a first target wavelength;
   for a second selected monitoring wavelength, a second wavelength locker adapted to generate a second control signal proportional to a difference between the second selected monitoring wavelength and a second target wavelength;
   wherein seed laser driver control signals used to adjust the respective seed laser drivers are a function of the first and second control signals;
   wherein at least one of the first and second selected monitoring wavelengths are other than target seed laser driver wavelengths.

10. An apparatus according to claim 9, wherein the first and second selected monitoring wavelengths are other than target seed laser driver wavelengths.

11. An apparatus according to claim 9, wherein at least one of the first and second selected monitoring wavelengths which are other than the target seed laser driver wavelengths are selected to be near or at an outer edge of an overall set of wavelengths generated by the MWLS.

12. An apparatus according to claim 9, wherein a first selected monitoring wavelength and a second selected monitoring wavelength are selected to be near or at opposite outer edges of the overall set of wavelength generated by the MWLS.

13. An apparatus according to claim 9, wherein tuning a seed laser comprises performing locking based on the selected monitoring wavelength to generate an adjustment signal which is then used to control a seed laser driver.

14. An apparatus according to claim 9 comprising:
   a tap coupler for extracting a portion of an output signal of the MWLS;
   a splitter for splitting the portion of the output signal into first and second signals;
   a first band pass filter (BPF) adapted to filter the first signal to produce an input to the first wavelength locker;
   a second BPF adapted to filter the second signal to produce an input to the second wavelength locker.

15. An apparatus according to claim 9, further comprising:

drift calculating means for determining the seed laser driver control signals for the seed lasers as a function of wavelength adjustments determined by the wavelength lockers.

16. An apparatus according to claim 9 comprising drift calculating means operating in accordance with the following equations, where $\lambda_i$ and $\lambda_{i+1}$ are the desired wavelengths of the two seed lasers, $\lambda_p$ and $\lambda_q$ are monitoring wavelengths, the seed wavelengths $\lambda_i$ and $\lambda_{i+1}$ drift by $\delta_i$ and $\delta_{i+1}$ to $\hat{\lambda}_i$ and $\hat{\lambda}_{i+1}$ respectively, the monitoring wavelengths drift by $\delta_p$ and $\delta_q$ for $\lambda_p$ and $\lambda_q$, respectively:

$$\delta_i = \frac{\begin{vmatrix} \delta_p & (p-i) \\ \delta_p & (p-i) \end{vmatrix}}{\begin{vmatrix} 1-p+i & p-i \\ 1-q+i & q-i \end{vmatrix}} = \frac{(q-i)\delta_p - (p-i)\delta_q}{(1-p+i)(q-i)-(1-q+i)(p-i)}$$

$$\delta_{i+1} = \frac{\begin{vmatrix} 1-p+i & \delta_p \\ 1-q+i & \delta_q \end{vmatrix}}{\begin{vmatrix} 1-p+i & p-i \\ 1-q+i & q-i \end{vmatrix}} = \frac{(1-p+i)\delta_q - (1-q+i)\delta_p}{(1-p+i)(q-i)-(1-q+i)(p-i)}.$$

* * * * *